United States Patent [19]

Lindenschmidt et al.

[11] 4,360,455

[45] Nov. 23, 1982

[54] PREPARATION OF MIXTURES OF BROMINATED POLYSTYRENES AND BROMINATED AROMATIC COMPOUNDS

[75] Inventors: Gerhard Lindenschmidt, Leimen; Wolfgang Schulte, Hassloch; Franz Brandstetter, Neustadt; Herbert Naarmann, Wattenheim; Klaus Penzien, Frankenthal, all of Fed. Rep. of Germany

[73] Assignee: BASF Aktiengesellschaft, Fed. Rep. of Germany

[21] Appl. No.: 228,368

[22] Filed: Jan. 26, 1981

[30] Foreign Application Priority Data

Feb. 21, 1980 [DE] Fed. Rep. of Germany ....... 3006448

[51] Int. Cl.$^3$ ............................................. C08L 27/24
[52] U.S. Cl. .................................. 252/609; 525/356; 525/357
[58] Field of Search ................. 252/609; 525/356, 357

[56] References Cited

U.S. PATENT DOCUMENTS

| | | |
|---|---|---|
| 2,676,946 | 4/1954 | McCurdy et al. |
| 4,074,032 | 2/1978 | Naarmann et al. ................... 526/44 |
| 4,143,221 | 3/1979 | Naarmann et al. ................... 526/44 |
| 4,144,288 | 3/1979 | Miano ............................. 260/880 R |
| 4,200,703 | 4/1980 | Diebel et al. ........................ 525/357 |

*Primary Examiner*—Maurice J. Welsh
*Attorney, Agent, or Firm*—Keil & Witherspoon

[57] ABSTRACT

A mixture of brominated oligomeric polystyrenes, having a degree of polymerization of from 3 to 400, and low molecular weight brominated aromatic compounds of the diphenyl ether type is obtained by polymerizing the non-brominated starting materials, in a halohydrocarbon solvent, using a Lewis acid catalyst. The reaction mixture is then brominated and extracted with water to remove hydrogen bromide and catalyst, and the solvent and volatile constituents are separated from the product. The bromination is carried out at from $-30°$ C. to $+130°$ C. The final mixtures have a low melt viscosity and are therefore particularly suitable for incorporation, as a flameproofing agent, into thermoplastics.

2 Claims, No Drawings

PREPARATION OF MIXTURES OF BROMINATED POLYSTYRENES AND BROMINATED AROMATIC COMPOUNDS

The present invention relates to a process for the preparation of mixtures of brominated aromatic compounds and brominated polystyrenes.

The preparation of brominated polystyrenes has been disclosed, for example in:
(1) German Pat. No. 2,537,385
(2) German Laid-Open Application DOS No. 2,651,435
(3) German Laid-Open Application DOS No. 2,800,012
(4) German Laid-Open Application DOS No. 2,800,013

Publications (1) to (4) describe processes for the bromination of polystyrenes of various molecular weights. In these conventional processes, polystyrenes are brominated in solution, and the resulting brominated products are worked up via a melt. Depending on the bromine content and the molecular weight of the polystyrene employed, relatively high temperatures may have to be used to work up the melt, and this can cause a deepening of color, the formation of crusts on the vessel wall, or corrosion of equipment.

It is an object of the present invention to provide a process by which the above shortcomings are substantially avoided.

We have found that this object is achieved, according to the invention, by brominating the polystyrene in the presence of certain aromatic compounds.

Accordingly, the invention relates to a process for the preparation of mixtures of brominated polystyrenes and brominated aromatic compounds, wherein
(a) polystyrenes which have a degree of polymerization of from 3 to 400 and may or may not contain olefinic double bonds are reacted, in the presence of a halohydrocarbon solvent and of from 1 to 40% by weight, based on polystyrene, of a Lewis acid catalyst, and
(b) in the additional presence of aromatic compounds of the general formula

where R is $CH_3—$, $C_2H_5—$, 2-haloethyl, phenyl or phenoxy and R' is H—, $CH_3—$, $C_2H_5—$, 2-haloethyl, phenyl or phenoxy, with bromine at from $-30°$ C. to $+130°$ C. the hydrogen bromide and Lewis acid catalyst are extracted with water and the solvent and any other volatile constituents are removed from the organic phase.

The product mixtures obtained by the process according to the invention have a substantially lower melt viscosity than the products obtained in the absence of the aromatic compounds (b). The product melt can therefore be processed, and worked up, at a lower temperature; this provides an energy saving and also entails reduced corrosion of the materials of the vessels, reactors, processing machinery and the like, which are employed. Furthermore, at high bromine contents the brominated product mixtures show a lighter color and greater heat stability than the products which have been obtained under identical conditions except for the absence of the aromatic compounds (b).

The substantially lower viscosity of the product melt according to the invention furthermore facilitates the incoporation of fillers, synergistic agents, pigments and the like. The incorporation of up to 50% by weight of $SnO_2$ or $Sb_2O_3$ is particularly advantageous; the melts thus obtained do not dust on subsequent granulation or milling, or during compounding when used as flameproofing agents for thermoplastics.

Polystyrenes (a) with degrees of polymerization of from 3 to 400, especially of from 6 to 200, may be used in the process according to the invention. The preparation of such polystyrenes is sufficiently wellknown. Publication (2) refers, in respect of the preparation of low molecular weight polystyrenes by thermal polymerization, to German Laid-Open Application DOS 2,239,356 and to British Pat. No. 549,930. The low molecular weight polystyrenes may be prepared in the absence of an initiator, at from 200° to 400° C. The molecular weight of the oligomers obtained is the lower, the higher the polymerization temperature. The oligomers contain one terminal double bond per macromolecule. These low molecular weight polystyrenes may be employed direct in the process according to the invention, but it is equally possible to remove the olefinic double bonds, remaining in the oligomers from the process of synthesis, by selective hydrogenation prior to bromination. Such selective hydrogenation is carried out in a conventional manner, and using conventional hydrogenation catalysts based on metals or salts of metals of group VIII of the periodic table. Suitable hydrogenation processes are described in U.S. Pat. No. 3,113,986, German Published Application DAS 1,222,260 and German Laid-Open Application DOS No. 2,013,263. In this selective hydrogenation, which is carried out at hydrogen pressures of from 1 to 100 bar and at from 25° to 155° C., the aromatic double bonds remain unattacked.

Preferred polystyrenes (a) for the process according to the invention are those which have been prepared by cationic polymerization. The preparation of low molecular weight polystyrenes by cationic polymerization is known; reference may be made to publication (2). The cationic polymerization of styrene is carried out in a conventional manner, using a Lewis acid catalyst. The amount of catalyst employed depends on the desired molecular weight and desired molecular weight distribution of the polystyrene, and is in general from 1 to 20% by weight, based on styrene to be polymerized. For details, reference may be made to publication (2).

Polystyrenes which are suitable for the process according to the invention and have the stated degrees of polymerization can also be prepared by anionic polymerization. This is carried out by means of lithiumorganic compounds, in the presence of a solvent, at an elevated temperature. Amongst the polystyrenes mentioned those prepared by cationic polymerization are however preferred, since they can be obtained particularly economically.

The process according to the invention is carried out in the presence of a halohydrocarbon solvent. For the purposes of the invention, suitable halohydrocarbons include methylene chloride, chloroform, carbon tetrachloride, 1,2-dichloroethane, tetrachloroethane, 1,1,2-trichloroethane, dibromoethane, 1,2-dibromoethane and the corresponding fluorohydrocarbons or hydrocarbons containing more than one halogen. Amongst these compounds, 1,2-dichloroethane is preferred. For economic reasons, the solutions employed as a rule should have a very high concentration of polystyrene.

Hence, the bromination is carried out with solutions containing from 10 to 60% by weight of polystyrene, based on the weight of halohydrocarbons. However, the halohydrocarbons to be employed according to the invention can also be partially or completely replaced by the aromatic compounds (b).

Suitable low molecular weight aromatic compounds (b) are those of the general formula

where R is methyl, ethyl, 2-haloethyl, phenyl or phenoxy and R' is H, CH$_3$—, C$_2$H$_5$—, 2-haloethyl, phenyl or phenoxy.

Amongst the compounds conforming to the above formula, the low molecular weight aromatic compounds containing 2 or more aromatic rings, such as diphenyls or diphenyl ethers, are particularly preferred. Compounds (b) containing only one aromatic nucleus, e.g. toluene or ethylbenzene, also give the improvements characteristic of the novel process; however, because of the volatility of the low molecular weight bromine derivatives (b) containing only one aromatic nucleus, the flameproofing agents prepared from the melts may suffer from certain disadvantages.

The amount of aromatic compound (b) added, relative to the polystyrene employed in the process according to the invention, can vary within wide limits. Even as little as 0.5% by weight of aromatic compound used in the process according to the invention produces a substantial reduction in viscosity of the product melt. The upper limit of the content of aromatic compound, relative to polystyrene, is in the main imposed by the intended use. The brominated entirely low molecular weight aromatic compounds are known per se and can also be employed, by themselves, as flameproofing agents. For flameproofing of thermoplastics, contents of the aromatic compound (b) of from 0.2 to about 60% by weight, based on the weight of polystyrene, suffice. These data relate to the material prior to bromination.

Lewis acid catalysts which are suitable for the process according to the invention and are used in amounts of from 1 to 40% by weight, preferably from 2 to 20% by weight, based on the sum of polystyrene and aromatic compound (b), include, in particular, iron, iron-(III) chloride, iron-(III) bromide, aluminum, aluminum-(III) chloride, aluminum-(III) bromide, boron-(III) fluoride, boron-(III) fluoride etherate, copper-(II) bromide and the like. Iron, iron-(III) chloride and aluminum-(III) chloride are particularly advantageous.

To carry out the process according to the invention, low molecular weight polystyrene (a), having a degree of polymerization of from 3 to 400, in a suitable halohydrocarbon solvent, is first introduced into a suitable apparatus, which may, for example, be a stirred kettle. The low molecular weight aromatic compound (b) and one of the conventional bromination catalysts are then added. Catalyst need not be added if cationic polystyrenes obtained as described in (2) are employed. The mixture is stirred and the envisaged or calculated amount of bromine is run in at from −30° to +130° C. After completion of the reaction, the mixture is extracted with water, if necessary repeatedly, until the aqueous phase is neutral. The organic and aqueous phases are separated. The organic phase is preferably freed from residual solvent and small amounts of volatile constituents by distillation. This leaves a product melt of brominated polystyrene and low molecular weight bromoaromatic, which solidifies at room temperature to give a transparent, very substantially amorphous solid.

From 0.1 to 3% by weight, based on solids, of conventional additives such as phosphites, phosphates, metal stearates, metal sulfates, metal oxides, organotin compounds, epoxides, antioxidants or light stabilizers may be added to the reaction mixture before distilling off the solvent and/or small amounts of volatile constituents. Furthermore, the conventional synergistic agents for the flameproofing agent, in particular SnO$_2$, Fe$_2$O$_3$, Bi$_2$O$_3$ and Sb$_2$O$_3$, may be added at this stage of the preparation of the reaction mixture.

The reaction mixtures obtained by the process according to the invention can in principle also be obtained by mixing brominated polystyrenes and bromoaromatic compounds. This however requires the separate preparation of two brominated starting materials, entailing different methods of preparation and of working up, and is therefore uneconomical.

The mixtures obtained by the process according to the invention may be used for flameproofing thermoplastics. Suitable thermoplastics for such flameproofing include polyethylene, polypropylene, polystyrene, ABS polymers, polyalkylene terephthalates and nylons. The preferred application is for flameproofing ABS polymers. The high heat stability and good flow of the flameproofing system obtained by the process according to the invention deserve particular mention.

The incorporation, into thermoplastics, of the flameproofing agent and of the synergistic agent which may or may not be used, as well as of the further additives which may be employed, can be carried out by suitable conventional mixing processes, for example in extruders or kneaders or on rolls.

The mixtures obtained by the process according to the invention can also be incorporated, into the desired thermoplastics, in the form of a concentrate. The concentrates, in granule or powder form, can then be incorporated into a further amount of thermoplastic, so as to arrive at the desired composition.

Self-extinguishing moldings and profiles can be produced, by injection-molding or extrusion, from the mixtures with thermoplastics prepared using the reaction mixtures resulting from the process according to the invention.

The melt viscosities were measured in a capillary viscometer at 190° C.; for low viscosity melts, a balance rheometer was used as the rotary viscometer (CBR Rotmod). The results are expressed in units of a Pascal second (Pa.s.).

To test the mechanical properties of thermoplastics into which the reaction mixtures obtained by the process according to the invention have been incorporated, standard bars or disks of 2 mm thickness and 60 mm diameter were produced on an Arburg Allrounder 200 injection-molding machine at 250° C. The notched impact strength was determined according to DIN Standard Specification 53,453 and the damaging energy in an impact test was determined according to DIN 53,443.

The data concerning the degree of polymerization of the polystyrene are based on the number-average molecular weight determined by vapor pressure osmometry.

The flameproofing is assessed in the Underwriter Laboratories vertical burning test, the material being classified in Fire Hazard Category 94 VE-O, 94 VE-1 or 94 VE-2.

To test the migration of the flameproofing agent, sheets of size 100×100×2 mm were compression-molded at 230° C. The cycle comprised 3 minutes heating-up, 3 minutes pressure at 230° C., and 8 minutes cooling to 23° C. The sheets were stored in a drying oven at 60° C. and visually examined, at certain intervals, for the formation of a surface film.

The Examples and comparative experiments which follow illustrate the invention. Parts and percentages are by weight, unless stated otherwise.

EXAMPLES 1 to 5

To carry out Examples 1 to 5, an anhydrous solution of the amount (in grams) of polystyrene shown in Table 1 (the polystyrene having been prepared as described in German Laid-Open Application DOS 2,239,356 and British Pat. No. 549,930 and having a degree of polymerization of 11), and the amount of diphenyl ether (in grams) also shown in the Table, in 600 ml of 1,2-dichloroethane, was prepared in a 2 liter glass flask. 20 g of AlCl$_3$ were added to this anhydrous solution and 480 grams of bromine were then run in over 3 hours at from 0° to 5° C., whilst stirring. After allowing a further 2 hours reaction time, from the end of the addition of the bromine, at the same temperature, the reaction mixture was extracted with water; this treatment was continued until bromide ions were no longer detectable in the aqueous phase, and the latter also no longer gave an acid reaction. After separating off the aqueous phase, 6.8 grams of tridecyl phosphite were added to the reaction mixture, and solvent and other volatile constituents were removed. The melt was degassed over 15 minutes at 200° C. and 3 mbar. 330-345 grams of brominated reaction product, corresponding to 95-99% of theory, were obtained. This product solidified at room temperature to give a transparent melt, which contained 69% of bromine. The melt viscosity $\eta$ in [Pa.s], measured at 190° C., is also shown in Table 1.

TABLE 1

| Example | Polystyrene | Diphenyl ether | $\eta$ [Pa.s] |
| --- | --- | --- | --- |
| 1 | 104 | 0 | 80 |
| 2 | 97 | 7 | 30 |
| 3 | 90 | 14 | 13 |
| 4 | 78 | 26 | 2.4 |
| 5 | 52 | 52 | about 0.1 |

EXAMPLES 6 to 11

The amounts of styrene (in grams) shown in Table 2 are run, over 1 hour, into an anhydrous stirred mixture of 4.1 grams of AlCl$_3$ and 600 ml of 1,2-dichloroethane at 5°-10° C. To complete the cationic polymerization of the styrene the mixture is then stirred for 30 minutes at 0°-5° C.; the polystyrene obtained has a degree of polymerization of 15. The amounts of diphenyl ether (in grams) shown in the Table, and a further 15.9 grams of AlCl$_3$, are then added, whilst stirring, and the bromination and working up are carried out as described in the preceding Examples 1 to 5. 330-345 grams, corresponding to 95-99% by theory, of a brominated reaction product are obtained as a yellow to brown melt which solidifies at room temperature to give a transparent product having a bromine content of 69%. The melt viscosities, measured at 190° C., are also shown in Table 2.

TABLE 2

| Example | Styrene | Diphenyl ether | $\eta$ [Pa.s] |
| --- | --- | --- | --- |
| 6 | 104 | 0 | 340 |
| 7 | 101 | 3 | 210 |
| 8 | 97 | 7 | 105 |
| 9 | 90 | 14 | 22 |
| 10 | 78 | 26 | 3 |
| 11 | 52 | 52 | about 0.1 |

EXAMPLE 12

The procedure described in Example 3 is followed, but instead of diphenyl ether, the same amount of diphenyl is used. 335 grams of reaction product having a bromine content of 69% are obtained; the melt viscosity at 190° C. is found to be 10 Pa.s.

EXAMPLE 13

The procedure described in Example 7 is followed, but instead of diphenyl ether, the same amount of 1-phenyl-2-bromoethane is used. 338 grams of bromination product, containing 69% of bromine and having a melt viscosity, measured at 190° C., of 205 Pa.s. are obtained.

EXAMPLE 14

17.5 parts by weight of the mixture of flame-proofing agents prepared according to Example 11, 5 parts by weight of antimony trioxide and 0.3 parts by weight of 4,4-butylidene-bis-(3'-methyl-6-tert.butylphenol) are mixed, at room temperature, in a Fluidmischer from Henschel. The mixture obtained, together with 77 parts by weight of ABS containing 22 parts by weight of polybutadiene, is melted and homogenized in an extruder at 230° C., and is then extruded and granulated. The standard bars and disks required for the measurements shown below are prepared from the granules obtained. The following properties are found:

| | |
| --- | --- |
| Notched impact strength at 23° C.: | 14 kJ/m$^2$ |
| Damaging energy at 23° C. | 16 Nm |
| Fire Hazard Category according to UL 94: | VE-O |

Compression-molded sheets prepared from samples of the granules show no surface film whatsoever after 500 h at 60° C.

We claim:

1. A process for the preparation of a mixture of brominated polystyrenes and brominated aromatic compounds, wherein (a) polystyrenes which have a degree of polymerization of from 3 to 400 and may or may not contain olefinic double bonds are reacted, in the presence of a halohydrocarbon solvent and of from 1 to 40% by weight, based on polystyrene, of a Lewis acid catalyst, and (b) in the additional presence of aromatic compounds of the general formula

where R is CH$_3$—, C$_2$H$_5$—, 2-haloethyl, phenyl or phenoxy and R' is H—, CH$_3$—, C$_2$H$_5$—, 2-haloethyl, phenyl or phenoxy, with bromine at from $-30°$ C. to $+130°$ C., the hydrogen bromide and Lewis acid catalyst are extracted with water and the solvent and any other volatile constituents are removed from the organic phase.

2. A mixture obtained by the process as claimed in claim 1.

* * * * *